E. C. OATLEY.
MACHINE FOR JOINTING AND GRINDING SAWS AND OTHER CUTTERS.
APPLICATION FILED MAR. 15, 1912.
1,117,595.
Patented Nov. 17, 1914.
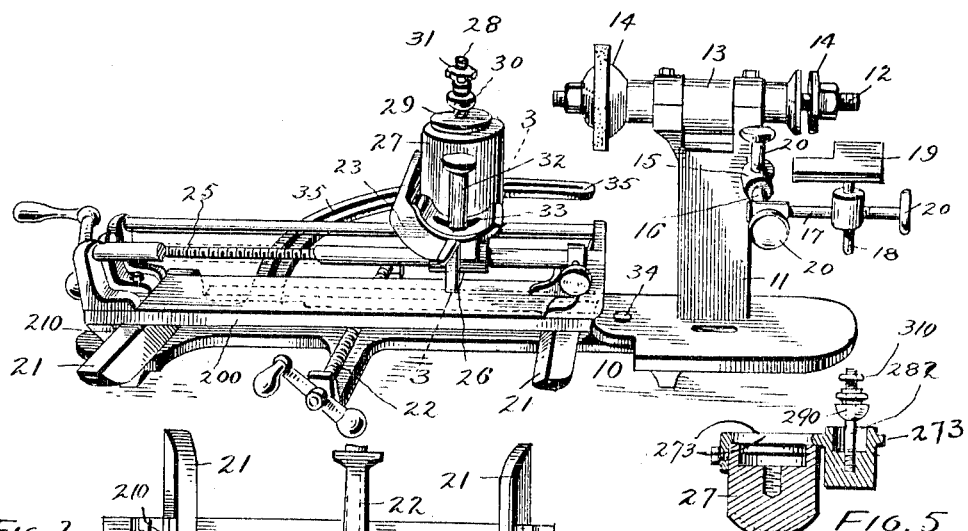
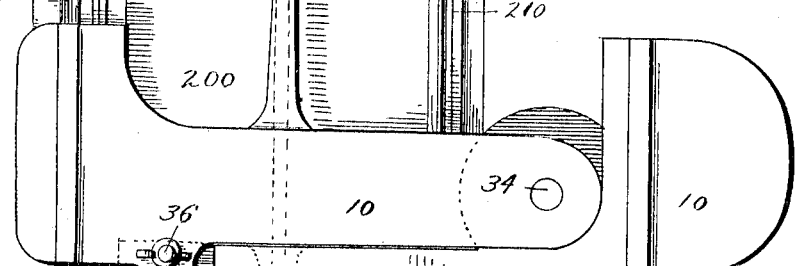
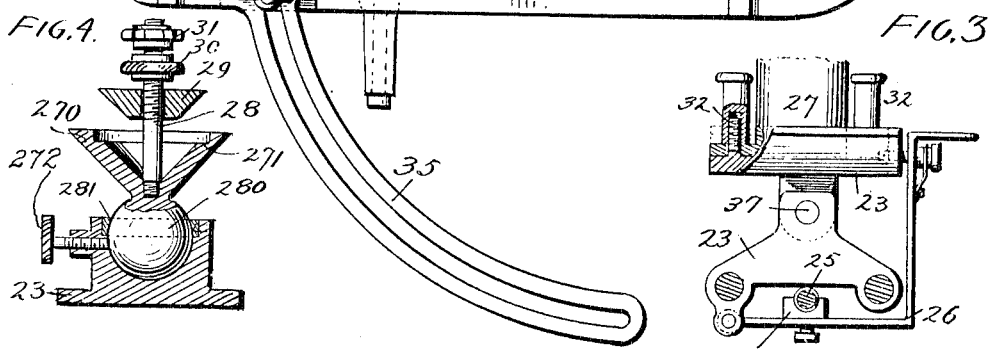
WITNESSES
A. P. Hayes
C. J. Williamson
INVENTOR
Ellzey C. Oatley,
by Chas. H. Fowler
Attorney

UNITED STATES PATENT OFFICE.

ELLZEY C. OATLEY, OF STEVENS POINT, WISCONSIN.

MACHINE FOR JOINTING AND GRINDING SAWS AND OTHER CUTTERS.

1,117,595.   Specification of Letters Patent.   Patented Nov. 17, 1914.

Application filed March 15, 1912. Serial No. 684,040.

*To all whom it may concern:*

Be it known that I, ELLZEY C. OATLEY, a citizen of the United States, residing at Stevens Point, in the county of Portage and State of Wisconsin, have invented certain new and useful Improvements in Machines for Jointing and Grinding Saws and other Cutters, and do hereby declare that the following is a full, clear, and exact description of the same, reference being had to the annexed drawings, making a part of this specification, and to the letters and figures of reference marked thereon.

The object of my invention is to provide a machine of simple or compact construction adapted to joint and sharpen the various cutting tools, such as saws and dado cutters used in wood and metal working machines, and thus supply a lack, which, in my experience I have learned exists, and to this end my invention consists in the machine constructed substantially as hereinafter specified and claimed.

In the accompanying drawings—Figure 1 is a perspective view of a machine embodying my invention; Fig. 2 is a bottom view of said machine; Fig. 3 is a cross section on the line 3—3 of Fig. 1; Fig. 4 is a detail view in section of a work holder for grinding cutters requiring an angle not attainable by the work holder shown in the other figures; and Fig. 5 is a detail view in section of a work holder for smaller cutters, or saws than that shown in Fig. 1.

In the embodiment of my invention illustrated in the drawings, I employ a base or table 10, which is adapted to be set on a work bench, which near one end has a post or standard 11 having bearings for a horizontal arbor or mandrel 12 that is provided intermediate its end with a pulley 13 adapted to be belted to some conveniently located driving shaft. Near each end the arbor is provided with a clamp 14 for the attachment of an emery, or grinding wheel, and provision is made to support the work to be operated on so that each grinding wheel may act on the work, the two work holders being of different constructions and capabilities by reason of varying kinds of saws or cutters to be operated on, and these will be, respectively, described in detail.

Projecting from the post or standard 11, a short distance below the arbor, is a horizontal hollow boss 15 in which is rotatably and slidably mounted an arm 16 having at its outer end a boss perforated at right angles to the length of the arm in which is rotatably and slidably mounted a similar arm 17 having a boss perforated at right angles to its length to receive the stem 18 of a rest or table 19, which stem is rotatably and longitudinally movable in said boss. Set screws 20 are respectively provided to clamp the rods and stem at any desired adjustment, either longitudinally or rotatably, and it will be seen that the work table or rest may thus be set at any desired angle to hold the work thereon in such position, with reference to the emery wheel, as may be called for by the shape or configuration of the cutter or tool to be ground. By reason of its universal adjustability, the table or rest 19 adapts the machine for use with different sorts of tool grinding done in a wood and metal working plant.

On the side of the support or post opposite that on which the table or rest is supported, and upon the upper side of the base 10 is a carriage 200 that is movable back and forth, at right angles to the longitudinal axis of the emery wheel arbor, and is held in place and guided in its movement by a pair of parallel beveled or undercut tracks or guides 21, which are engaged by adjustable gibs, and for traversing said carriage back and forth, a feed screw 22, of well known construction and action, is provided. The carriage 200 has upon its upper side extending at right angles to its path of travel a pair of round rods which form guides or tracks for a supplemental carriage 23 which has on its underside a half nut 24 engaged by a feed screw 25, of usual construction, by means of which said supplemental carriage is traversable toward and from the near wheel on the arbor or mandrel 12. The half nut, by the action of a lever 26, is movable into and out of engagement with the feed screw so that when a quick traverse of the supplemental carriage is desired, it is necessary merely to disengage the half nut from the screw and slide said carriage along to the desired position when the half nut is reëngaged with the feed screw.

Mounted upon the upper side of the supplemental carriage is a block 27 with its upper or outer end hollowed or chambered giving it a cup form and passing outward therefrom at the center of the cup is a screw 28 upon which is mounted a conical or tapering form clamping washer 29 which by the action of a nut 30 is movable toward the cup so that a saw or cutter placed between the cup and the clamping washer may be firmly held in position for grinding. The cup and tapering form or clamp is used so that saws with eyes of greatly varying diameter may be held by the same clamp. A jam nut 31 is provided on the screw 28 in those cases where it is desirable to lock the adjusting nut. The work holder shown in Fig. 4 is for use with cutters that require a different angle for grinding than can be obtained by the work holder shown in the other figures of the drawings. In the case of the work holder shown in Fig. 4, the screw 28 rises from a ball 280 having a spherical bearing in the supplemental carriage 23 so that a ball and socket joint is afforded enabling a wide variety of angles for the cutter clamped between the clamp 270 and the ring or washer 29 at its upper end, the clamp 270 has an annular seat 271 for a rest to be used with small cutters. A binding screw 272 is provided to impinge upon the exterior of the ball and thereby lock the same in any desired angle of adjustment. The ball is retained in its seat by a ring 281. For clamping smaller saws the smaller clamp shown in Fig. 5 may be substituted for the one shown in Fig. 1. Said smaller clamp instead of being applied concentrically of the block 27 is supported eccentrically therein by a plate 273 secured to the top of the block 27 in the place occupied by the ring or washer 29, shown in Fig. 1, which with the elements of the larger clamp is removed. By reference to Fig. 4, it will be seen that the smaller eccentrically supported clamp has the same construction as the larger clamp shown in Fig. 1.

The saw or tool mounted on the supplemental carriage may require either a horizontal position or a vertical position or some inclined position to be properly acted upon by the emery wheel. To provide for this I form the surface of the supplemental carriage and the block 27 in contact on the curve of a cylinder so that the block may be rocked from a vertical to a horizontal position or at any desired angle, and to clamp it in the desired position a clamping screw 32 is provided that passes through a curvilinear slot in a flange 33 projecting laterally from the block and into the supplemental carriage.

The base or bed 10 is made of two members that are hinged or pivoted together by a vertical pivot 34 situated at such point that the portion thereof supporting the supplemental carriage 23 may be swung through substantially 90 degrees so that the carriage will stand with the line of travel of the carriage parallel with the axis of the emery wheel, or at right angles thereto, in which last named position it is possible to gum large saws and dado saws while in the work holder.

It will thus be seen that in each of the two positions to which the work holder may be swung by reason of the two part base hinged by the pivot 34, the saw or tool is in working relation to the emery wheel, work of one kind, grinding, for example, being performed when the saw is in one position, and work of another kind, gumming, for example, being performed when the saw, by change of the position of the work holder, is placed in the other position. This is due to the fact that the pivot 34 is located so that its axis is at or near the emery wheel so that the emery wheel is at or near the center about which the work holder swings.

The carriage-supporting member of the bed has a quadrant shaped arm 35 which passes beneath a portion of the other member of the bed, and a bolt 36 passing through the slot is provided to firmly secure the two bed parts in the desired relative position. In connection with the swinging movement thus provided for the carriage, I find it useful to joint or hinge the work holder so that it may swing laterally at right angles to the direction of travel of the supplemental carriage 23, a pivotal connection 37 being provided between the downwardly extending shank or stem of the work holder and the supplemental carriage 23. It will thus be seen that I can grind the tool on any bevel.

Having thus described my invention what I claim is—

The combination of a base composed of two sections pivotally connected together, a grinding wheel carrying arbor mounted upon one of said sections, a work holder mounted on the other section, said work holder being shiftable by the movement of the section which carries it from a working position in line with the axis of the grinding wheel arbor to a working position in a line that extends crosswise the axis of said arbor whereby without removal of the work from the work holder different kinds of operations may be performed on the work, an arm having a slot curved concentrically with the pivot of the two sections connected with one of them and a clamp bolt passing through the slot.

In testimony whereof I affix my signature in presence of two witnesses.

ELLZEY C. OATLEY.

Witnesses:
OTTO J. GOLDSTEIN,
WILLIAM N. CREASEY.